United States Patent [19]

Axelrod

[11] Patent Number: 5,240,720
[45] Date of Patent: * Aug. 31, 1993

[54] DOG CHEW WITH MODIFIABLE TEXTURE

[76] Inventor: Herbert R. Axelrod, 6 Marine Pl., Deal, N.J. 07753

[*] Notice: The portion of the term of this patent subsequent to Apr. 13, 2010 has been disclaimed.

[21] Appl. No.: 854,305

[22] Filed: Mar. 20, 1992

Related U.S. Application Data

[63] Continuation-in-part of Ser. No. 839,748, Feb. 20, 1992, Pat. No. 5,200,212, which is a continuation of Ser. No. 521,521, May 10, 1990, abandoned.

[51] Int. Cl.⁵ ............................................... A23K 1/00
[52] U.S. Cl. ........................................ 426/2; 426/106; 426/241; 426/512; 426/520; 426/576; 426/644; 426/646; 426/657; 426/805
[58] Field of Search .............. 426/576, 580, 641, 657, 426/234, 241–243, 805, 106, 646, 644, 533, 520, 512

[56] References Cited

U.S. PATENT DOCUMENTS

| | | | |
|---|---|---|---|
| 3,630,755 | 12/1971 | Schiffmann et al. | 426/241 |
| 3,958,932 | 5/1976 | Merriam | 426/805 |
| 3,978,236 | 8/1976 | Sair et al. | 426/580 |
| 3,978,244 | 8/1976 | Sair | 426/656 |
| 4,163,804 | 8/1979 | Meyer et al. | 426/641 |
| 4,224,348 | 9/1980 | Hayashi et al. | 426/242 |
| 4,364,925 | 12/1982 | Fisher | 426/805 |
| 4,409,250 | 10/1983 | Van Hulle et al. | 426/242 |
| 4,419,372 | 12/1983 | Greene et al. | 426/805 |
| 4,880,642 | 11/1989 | Berends | 426/456 |
| 4,904,495 | 2/1990 | Spanier | 426/805 |

OTHER PUBLICATIONS

Hawly, "Condensed Chemical Dictionary" 10th edition, Van Nostrand Reinhold Co. (1982), pp. 203 & 492.

*Primary Examiner*—R. B. Penland
*Attorney, Agent, or Firm*—Fulwider Patton Lee & Utecht

[57] ABSTRACT

A completely digestible highly nutritious dog chew, the texture or hardness of which is easily modified to suit a particular dog by the dog owner. By irradiating the chew in a microwave oven, the chew is caused to expand and is thereby rendered more easily chewable.

10 Claims, 1 Drawing Sheet

DOG CHEW WITH MODIFIABLE TEXTURE

This is a continuation-in-part of copending application Ser. No. 07/839,748 filed on Feb. 20, 1992, and issued on Apr. 6, 1993 as U.S. Pat. No. 5,200,212 which is a continuation of application Ser. No. 07/521,521, filed May 10, 1990, now abandoned.

BACKGROUND OF THE INVENTION

1. Field of the Invention

The present invention relates to dog chew and more particularly pertains to edible dog chew.

2. Brief Description of the Prior Art

Most dogs enjoy chewing on things although preferences vary as to the hardness of the substances favored. Some dogs like to chew on very hard materials such as cow bones, wood, nylon or polyurethane, others prefer softer chews such as rawhide while still others favor freeze dried snacks. Some dogs, due to their age, may not be able to chew on the very hard substances. Young dogs have insufficiently developed teeth while old dogs may have diseased gums or may have lost some of their teeth.

Many indigestible objects are given to dogs as a chew and although the dogs may enjoy chewing thereon, the objects are often swallowed in whole or in part. Once swallowed, these objects or fragments thereof can have an adverse effect on the dogs digestion and can become impacted in the dog's intestinal tract with life-threatening consequences.

In an attempt to make certain edible chews more appealing to dogs, a wide variety of additives are incorporated in products that, apart from being low in nutritional value, do not comprise particularly healthy supplements to a dog's diet. Often times the chew's taste is enhanced in order to make the particular chew more appealing to dogs who are otherwise not drawn to its hardness or texture.

The prior art is replete with both edible and inedible chew formulations that incorporate a wide variety of additives to make a product more appealing to certain dogs. The prior art however fails to provide a dog chew that is wholly digestible, nutritious, and of texture or hardness individually tailorable to suit a wide variety of dogs' preferences or needs.

SUMMARY OF THE INVENTION

The present invention provides a dog chew that is completely digestible, highly nutritious, devoid of deleterious additives and of a modifiable texture or hardness quickly and easily tailorable by the owner to suit the need or preference of his particular dog. The chew is formulated from wholly proteinaceous ingredients, is molded into preselected shapes and may be packaged in moisture-proof packaging to maintain preselected moisture content during storage and handling. Upon removal from the package, the chew can be caused to swell up to four times its original volume, if desired, by subjecting it to microwave radiation. With this procedure, the chew's texture or hardness can be adjusted from anywhere from its original high density, extremely hard state to a low density, expanded, easily chewed state depending on the amount of microwave exposure. The chew can thereby quickly and easily be tailored to the texture preference of a wide variety of dogs, from a strong, large, healthy dog to a small puppy with puppy teeth or an older dog with decayed molars.

More particularly, a formulation according to the present invention requires the intermixing of between 60-95% casein with 5-40% gelatin. High protein meal, such as poultry protein, can be substituted for a 25-75% portion of the casein, additionally, a very small amount of flavoring and coloring can be added to enhance taste and appearance. The mixture is subsequently melted by heat and pressure and molded into preselected shapes. The temperatures, moisture levels and handling during the mixing and molding and subsequent packaging procedure are precisely controlled to ensure that the resulting product has a moisture content of between 10% and 15%, and preferably at least 13%. The resulting chew is extremely hard while a $\frac{1}{2}$-3 minute exposure within a standard household microwave oven results in a light, easily chewed product for the dog.

Other features and advantages of the present invention will become apparent from the following detailed description, taken in conjunction with the accompanying drawings, which illustrate by way of example, the principles of the invention.

DETAILED DESCRIPTION OF THE PREFERRED EMBODIMENTS

The present invention provides a highly nutritious, completely digestible dog chew. The dog owner can quickly and easily modify the texture or hardness of the chew to suit his particular dog by simply microwaving the chew for a short period of time.

The ingredients initially combined to form the chew of the present invention include from 60% to 95% casein and 5% to 40% gelatin. Casein which is a protein derived from milk is highly nutritious and easily digested by dogs. The gelatin content effects the hardness of the product, the higher the content, the softer the product. A 95% casein to 5% gelatin ratio results in a very hard dog chew. Additionally, any high protein meal of animal origin which is easily digestible by dogs may be added as a filler to the casein/gelatin combination. The use of protein meal provides economic benefits although excessive quantities in the mixture can result in undesirable brittleness. It has been found that 25-75% of the casein can be replaced with poultry protein while a 50/50 poultry protein/casein mixture is preferred. Attractants, such as beef or ham flavoring, as well as colorings, can be added in very small quantities to enhance the appeal of the product to both the dog as well as the buyer.

Figure 1:
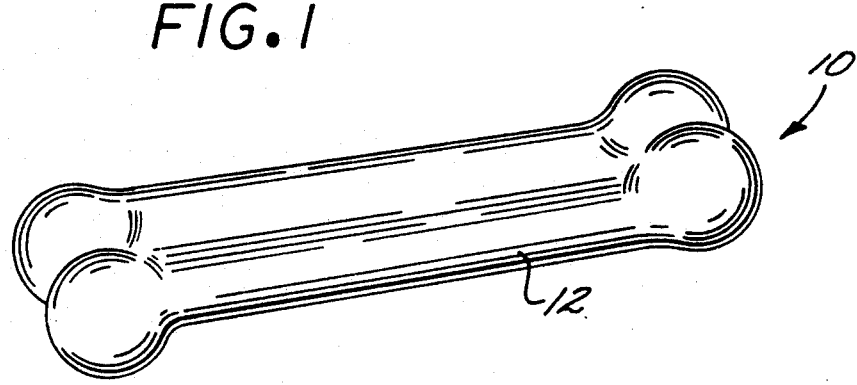
FIG. 1 illustrates the preferred embodiment of the invention in its unexpanded state.

In order to cause the above described ingredients to be intimately combined with one another, the mixture is heated to the components' melting temperatures under pressure. Adjustment of the mixture's moisture content is accomplished by either heating to drive off excess moisture, or steam injection, to increase moisture at which point the material is either extruded, or preferably, molded into preselected shapes. A standard injection molding machine is the preferred method of producing the chews of the present invention. A bone shape for the chew, such as illustrated in FIG. 1 is preferred so that the public more readily recognizes the intended use of the product.

The product is then dried to 14% moisture content and packaged in moisture-proof packing to preserve the moisture content of the chew at between 10% and 15% and, preferably, about 13%. Higher or lower moisture content affects the shelf-life of the product. Too much moisture causes the chew to deteriorate without the addition of stabilizers. Less than the 10% moisture level renders the product hygroscopic and brittle.

Figure 2:
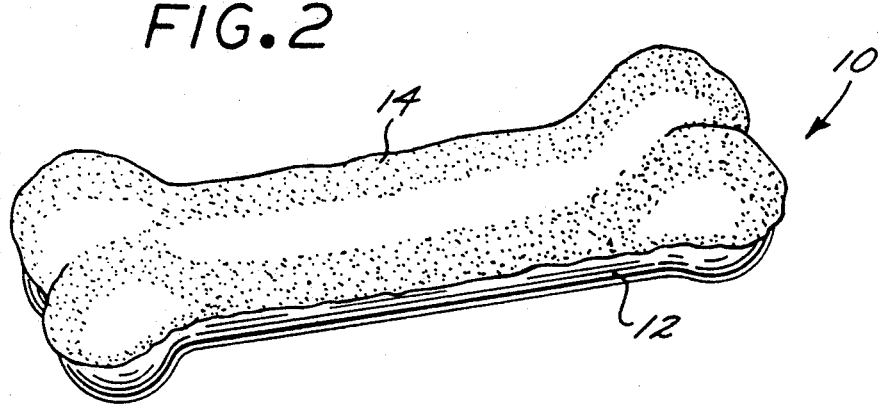
FIG. 2 illustrates the preferred embodiment of the invention in its partially expanded state.
Figure 3:
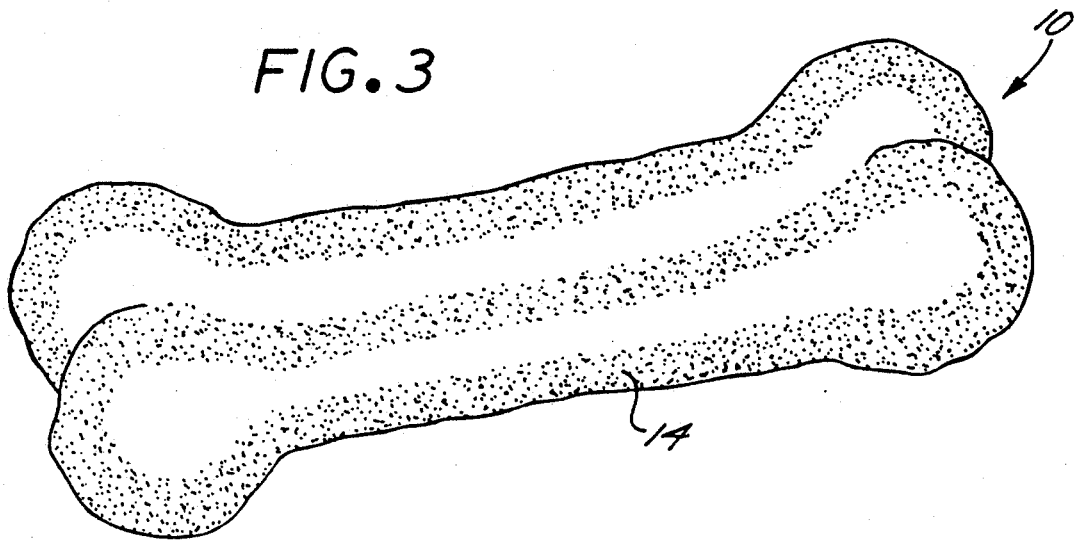
FIG. 3 illustrates the preferred embodiment of the invention in its fully expanded state.

Upon removal from the package, the person feeding the dog can modify the texture or hardness of the chew by heating, preferably in a microwave oven. The expansion of the moisture within the chew causes the chew to expand. Subjecting the chew to microwave radiation facilitates the heating of areas deep within the chew at the same time the exterior heats up and expands. FIG. 1 illustrates the chew 10 prior to heating, in which state it has a substantially smooth exterior surface 12 and is of an extremely hard texture preferred by some dogs. A short exposure to microwave radiation initiates the expansion process. FIG. 2 illustrates the chew 10 in a partially expanded state evidenced by a partially bubbled surface 14. In this state, the chew 10 is of an intermediate hardness preferred by some dogs. FIG. 3 illustrates the chew 10 in a fully expanded state as may result from a 30-180 second exposure in a standard household microwave oven. The entire chew 10 has a bubbled surface 14 and is easily chewable by most dogs. The chew in this state is ideal for small dogs with puppy teeth or old dogs who suffer from gum disease or who may have lost teeth. Sufficient exposure to microwave radiation will cause the chew to expand two to four times its original volume with a commensurate reduction in hardness.

EXAMPLE 1

Rennet casein, (95 lbs) and gelatin (5 lbs), both ingredients screened to 30 mesh and of edible quality, are intermixed in an injection molding machine hopper blender. A feeding screw transports the intermixed material to an injection molding machine. The stresses imposed by the mechanical action on the material substantially raises its temperature while steam injection can be employed to ensure that a sufficiently high temperature is attained wherein the mixture melts and is moldable. Depending on the injection molding machine utilized and the characteristics of the specific casein and gelatin, molding temperatures can vary from 130° F. to 390° F. The chew is then dried to 15% moisture and then packaged in a moisture proof packing to ensure that no moisture is lost.

EXAMPLE 2

Rennet casein (47½ lbs.), poultry protein (47½ lbs.), and gelatin (5 lbs.), all ingredients having been screened to 30 mesh and of edible quality, are combined and processed as set forth in Example 1. This formula provides an economically producible chew that is hard enough to be a challenge for dogs that prefer hard chews while subject to the desired expansion characteristic upon heating.

In use, the chew is given to the dog in its initial and hardest state. If the dog is unwilling or unable to chew on it, the chew is microwaved for short time increments and reoffered to the dog until the chew reaches a state of expansion and a degree of hardness preferred by the dog. Large, strong and healthy dogs would probably prefer the chew in its unmodified and hardest state while very small, young or very old dogs would refer the chew in its most expanded state.

While a particular form of the invention has been illustrated and described, it will also be apparent to those skilled in the art that various modifications can be made without departing from the spirit and scope of the invention. Accordingly, it is not intended that the invention be limited except as by the appended claims.

What is claimed is:

1. The combination of a completely digestible, highly nutritious dog chew that is quickly and easily, individually modifiable by a dog owner to the texture preferences or hardness need of a particular dog, and a package therefore, said combination consisting of:

a dog chew consisting of a homogenous mixture of about 47½% of poultry meal, 47½% casein and 5% gelatin, having a total moisture content of 10–15%, formed into a preselected shape, and a moisture-proof package containing the dog chew, whereby subsequent removal of said dog chew from said package and exposure to heat causes said chew to expand to the degree of hardness preferred by the particular dog.

2. The dog chew of claim 1, wherein a meat flavored attractant is added to the mixture.

3. The dog chew of claim 2, wherein an injection molding process is employed to shape the chew into a simulated bone appearance.

4. A method of feeding a dog with a highly nutritious completely digestible dog chew that is quickly and easily individually modifiable by a dog owner to the texture preference or hardness need of a particular dog, said method consisting essentially in the steps of:

intermixing a combination of 60–95% casein, 5–40% gelatin and poultry meal substituted for the casein in an amount of 25–75%;

adjusting the moisture content of said intermixed combination to total about 10–15%;

molding said adjusted combination into a preselected shape of said dog chew;

placing said molded dog chew in moisture-proof packaging before substantially any moisture is lost from said molded dog chew;

said dog owner removing said molded shape composition from said packaging;

said dog owner heating said molded dog chew just prior to consumption sufficiently to effect expansion thereof to the degree of hardness preferred by the particular dog; and then feeding the chew to the dog.

5. The method of claim 4, wherein said homogeneous mixture comprises about 47½ casein, 47½ poultry protein, and 5% gelatin, with a total moisture content of about 15%.

6. The method of claim 5, wherein the heat is applied by microwave radiation.

7. The method of claim 4, wherein a meat flavored attractant is added to the mixture.

8. The method of claim 7, wherein the heat is applied by microwave radiation.

9. The method of claim 4, wherein an injection molding process is employed to shape the chew into a simulated bone appearance.

10. The method of claim 4, wherein the heat is applied by microwave radiation.

* * * * *